(12) United States Patent
Boehne et al.

(10) Patent No.: US 6,434,500 B1
(45) Date of Patent: Aug. 13, 2002

(54) INTERFACE FOR MANAGING TEST DEFINITIONS

(75) Inventors: Scott D. Boehne, Savage; Todd A. Gates, Lakeville; Walt H. Sigtermans, Apple Valley; Patrick Dobrowski, Burnsville, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/419,958

(22) Filed: Oct. 18, 1999

(51) Int. Cl.[7] .................. G01R 27/28; G01R 31/00; G01R 31/14
(52) U.S. Cl. .................... 702/120; 345/967
(58) Field of Search .............. 702/57–59, 67, 702/68, 108, 117, 118, 119, 120, 121, 122, 123, 182–185; 700/83, 86, 87; 345/769, 839, 846, 835, 771, 773, 967

(56) References Cited

U.S. PATENT DOCUMENTS

| | | | |
|---|---|---|---|
| 5,576,946 A | | 11/1996 | Bender et al. |
| 5,598,521 A | | 1/1997 | Kilgore et al. |
| 5,617,120 A | * | 4/1997 | Kaneko ...................... 345/619 |
| 5,703,929 A | * | 12/1997 | Schillaci et al. ............... 379/21 |
| 5,796,602 A | | 8/1998 | Wellan et al. |
| 5,828,851 A | | 10/1998 | Nixon et al. |
| 5,903,455 A | | 5/1999 | Sharpe, Jr. et al. |
| 5,933,353 A | | 8/1999 | Abriam et al. |
| 6,002,868 A | * | 12/1999 | Jenkins et al. ................. 717/1 |
| 6,006,171 A | * | 12/1999 | Vines et al. ................. 702/184 |
| 6,128,016 A | * | 10/2000 | Coelho et al. ............... 345/808 |
| 6,141,608 A | * | 10/2000 | Rother ......................... 701/33 |
| 6,095,674 A1 | * | 8/2001 | Verissimo et al. ............ 700/83 |
| 6,330,517 B1 | * | 12/2001 | Dobrowski et al. .......... 702/104 |

FOREIGN PATENT DOCUMENTS

| | | |
|---|---|---|
| WO | WO 98 14855 | 4/1998 |
| WO | WO 98/36335 | 8/1998 |
| WO | WO 98 36353 | 8/1998 |

OTHER PUBLICATIONS

Holladay et al., "Specification for Field Calibrator Interface", Southwest Research Institute, Mar. 25, 1999.

* cited by examiner

*Primary Examiner*—John S. Hilten
*Assistant Examiner*—Demetrius Pretlow
(74) *Attorney, Agent, or Firm*—Westman, Champlin & Kelly (57) ABSTRACT

A method and apparatus for graphically managing test definitions of a field management system is disclosed. The method and apparatus establish a graphical user interface that is simple to use, efficient, user friendly, and displays test definition related information in an organized manner that can be easily understood by a user. The interface includes a device icon and a test procedure icon presented on a display. The device icon identifies testing data of a field device and the test procedure icon identifies a test procedure that has device testing parameters corresponding to the testing data. A test definition for the field device is created when the device icon and the test procedure icon are associated with each other.

29 Claims, 8 Drawing Sheets

INTERFACE FOR MANAGING TEST DEFINITIONS

BACKGROUND OF THE INVENTION

Process plants, such as chemical refinery plants, include many field devices, that control and measure parameters within the process. A field device can be a control device such as a valve controller or a measurement device such as a temperature or flow transmitter. The field device can be coupled to a communication bus such that the devices can communicate to a remote location such as a control room.

Field management systems are software packages, run on computers typically located at remote locations such as in the control room, used to manage the field devices. One such software package, Asset Management Solutions™, is available from Fisher-Rosemount. The field management system generally utilizes several software modules, each configured to perform different functions. The field management system maintains a database containing device-specific information related to each field device including testing data.

A calibrator is typically a portable unit used to calibrate field devices by performing a test on the field device. Before a calibrator can perform a test on a field device, the calibrator must be provided a test definition that relates to the field. device. Test definitions can be managed by the field management system, and generally include a test procedure and testing data. The test procedure can generally apply to several field devices and contains a list of device testing parameters that are needed to perform a test. The testing data, on the other hand, is device-specific information relating to the specific device to be tested. For example, if a device testing parameter identifies a duration that a test voltage is to be applied to the device, then the testing data would include information as to what the duration should be for the particular device to be tested. As a result, each test definition relates to a specific field device.

Generally, a user can manage test definitions of a field management system through a graphical user interface implemented on a general computer, However, current graphical user interfaces have failed to provide an interface that is simple, efficient, user friendly and capable of displaying information in a manner that can be easily understood by the user.

SUMMARY

A method and apparatus for graphically managing test definitions of a field management system is disclosed. The method and apparatus establish a graphical user interface that is simple to use, efficient, user friendly, and displays test definition related information in an organized manner that can be easily understood by a user. The interface includes a device icon and a test procedure icon presented on a display. The device icon identifies testing data of a field device and the test procedure icon identifies a test procedure that has device testing parameters corresponding to the testing data. A test definition for the field device is created when the device icon and the test procedure icon are associated with each other.

DETAILED DESCRIPTION

Although the invention will be described with reference to specific embodiments of an improved interface for managing test definitions, workers skilled in the art will recognize that changes can be made in form and detail without departing from the spirit and scope of the invention, which are defined by independent claims.

Figure 1:
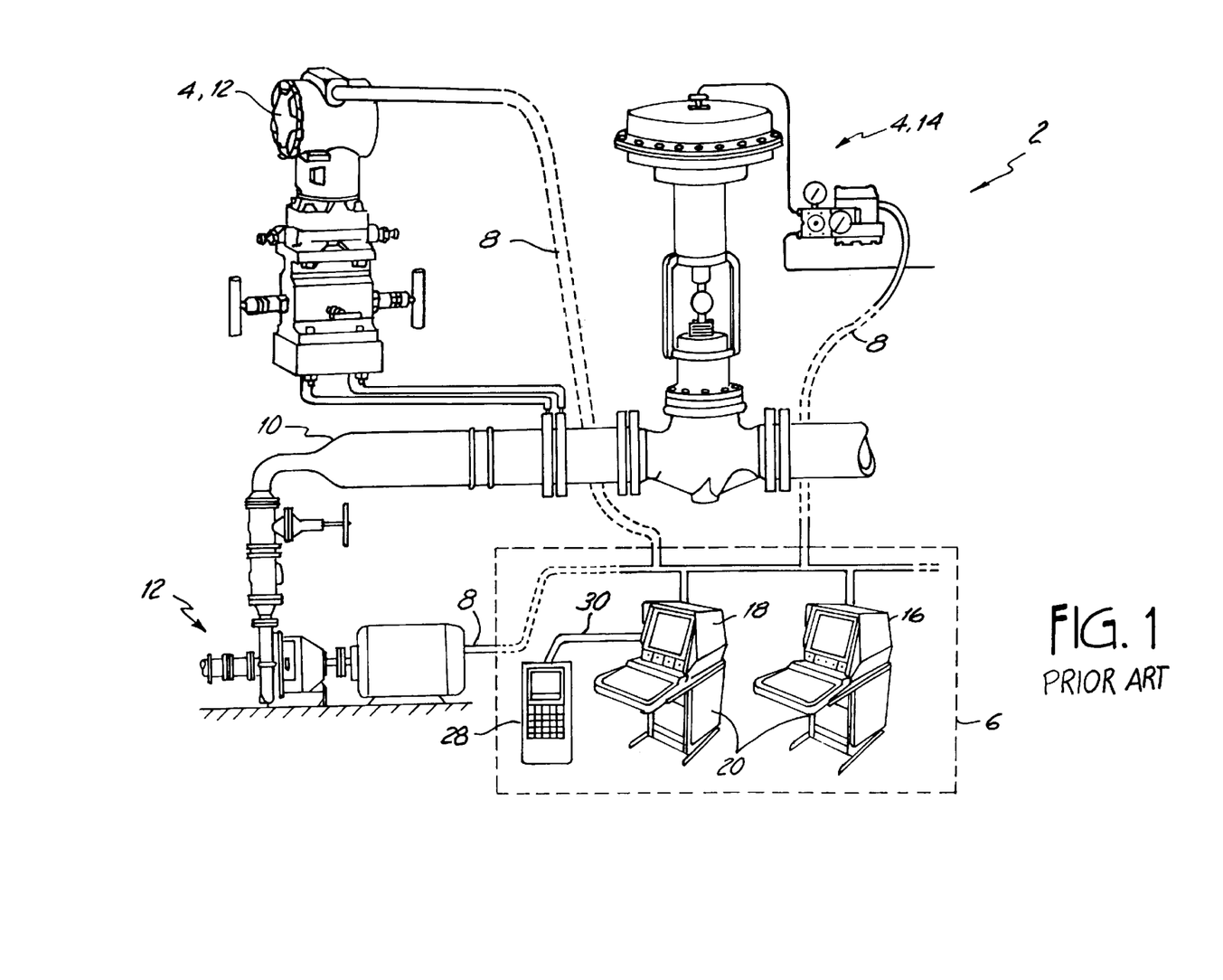
FIG. 1 is a diagram showing an environment of a field management system.

FIG. 1 is an environmental diagram showing a portion of a processing plant in which various embodiments operate. Processing plant 2 includes remotely located field devices 4 that are electrically coupled to a control room 6 with communication bus 8. Field devices 4 can be coupled to a process container, such as piping 10, and can include a process transmitter 12 and a process control device 14. Process transmitter 12 can, for example, be configured to measure a process variable such as a flow, a temperature, or a pressure. Process control device 14 can, for example, be a process control valve.

Figure 3:
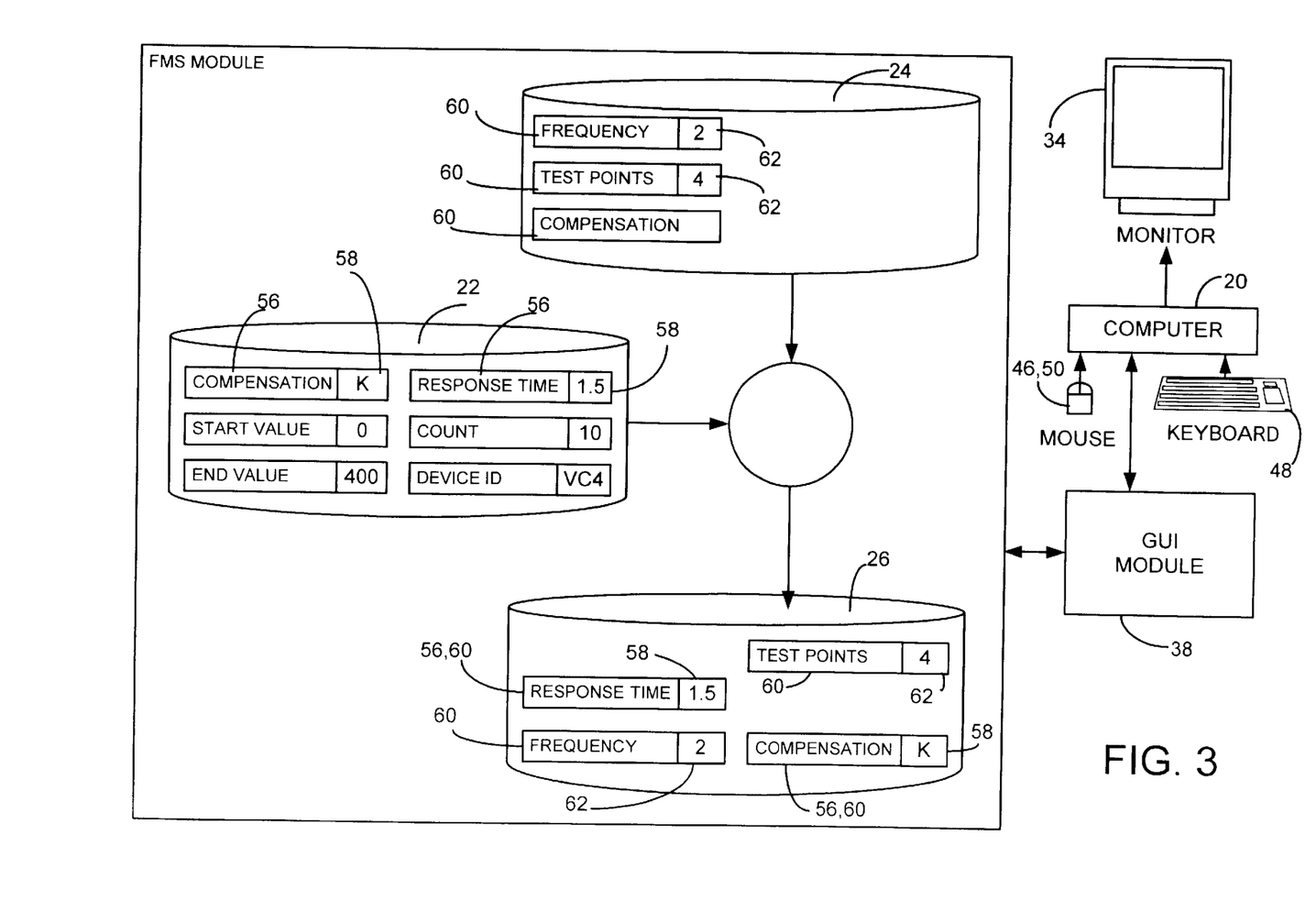
FIG. 3 is a simplified block diagram illustrating the creation of a test definition in accordance with one embodiment.

Control room 6 houses control system 16 and field management system (FMS) 18, which run on computers 20. Control system 16 controls the field devices 14 using control signals transmitted over communication bus 8. FMS 18 maintains a database of device-specific information pertaining to the field devices 4 including testing data 22 shown in FIG. 3. FMS 18 also manages test procedures 24 and test definitions 26 for testing field devices 4, as shown in FIG. 3. Test definitions 26 can be downloaded to calibrator 28 using a calibrator input-output (I/O) 30, as shown in FIG. 1.

Figure 2:
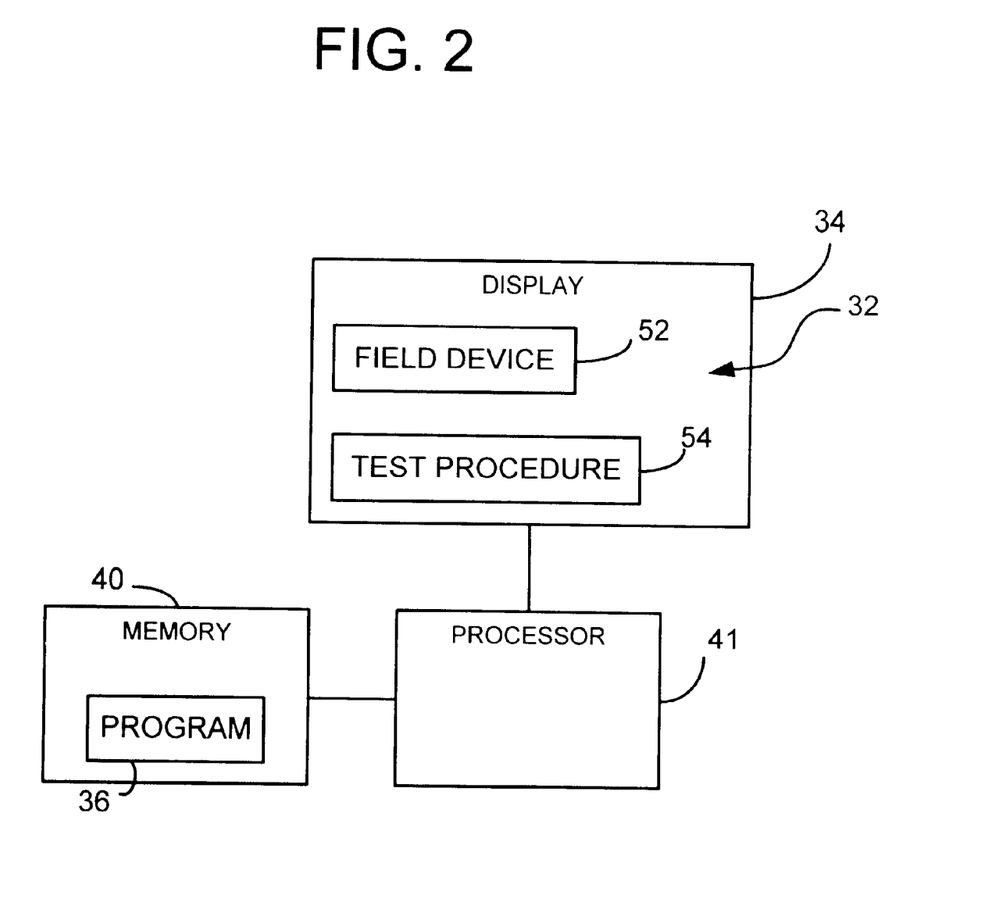
FIG. 2 is a simplified block diagram of an apparatus for managing test definitions in accordance with one embodiment.

FIG. 2 shows one embodiment that includes a graphical user interface (GUI) 32 on a display device 34 (monitor) that allows a user to manage test definitions 26, testing data 22, and test procedures 24 stored in FMS 18. GUI 32 is generally created using a program 36 stored in a memory 40 that can be executed by a processor 41. Typically, programs or program modules, include routine programs, objects, components, data structures, etc., which perform particular tasks or implement particular abstract data types. Tasks performed by the program modules are described below and with the aid of block diagrams and flowcharts. Those skilled in the art can implement the description, block diagrams and flowcharts to computer-executable instructions. In addition, those skilled in the art will appreciate that the invention may be practiced with other computer system configurations, including multi-processor systems, networked personal computers, mini-computers, main frame computers, and the like. The invention may also be practiced in distributed computing environments where tasks are performed by remote processing devices that are linked through a communications network. In a distributed computer environment, program modules and/or data may be located in both local and remote memory storage devices.

Figure 4:
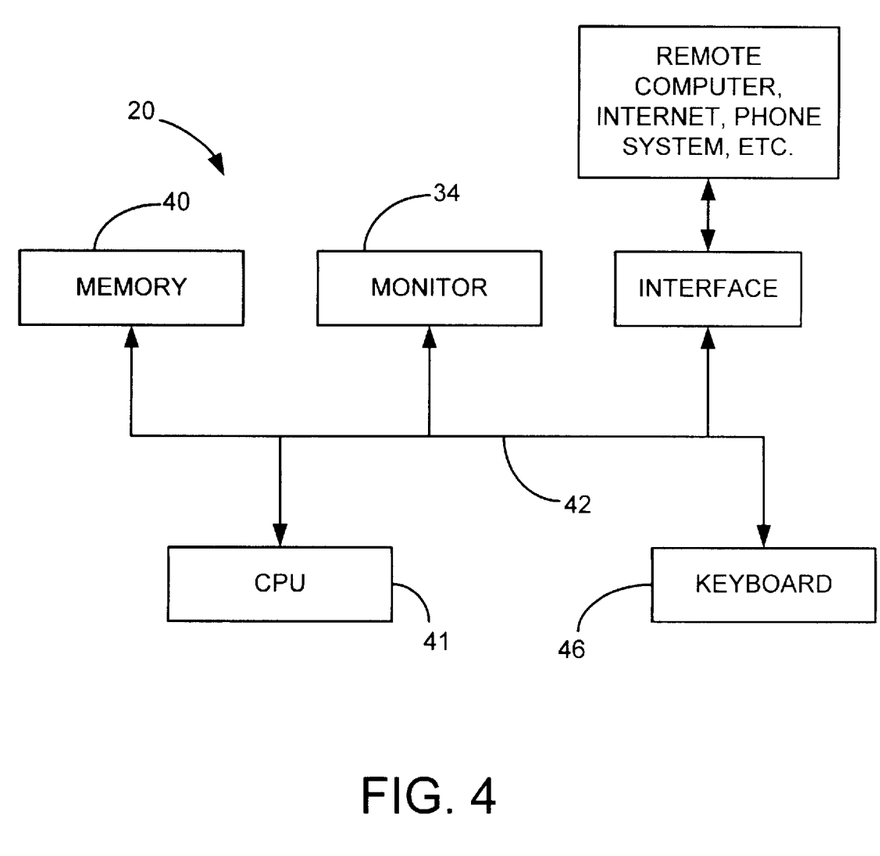
FIG. 4 is a simplified block diagram of a computer.

In one embodiment, program 36 can be a GUI module 38, that is executed by a computer 20, as shown in FIG. 3. FIG. 4 shows a simplified block diagram of computer 20 that can be a conventional computer having a central processing unit (CPU) or processor 41, a memory 40 and a system bus 42, which couples various system components, including the memory 40 to the processor 41. The system bus 42 may be any of several types of bus structures, including a memory bus or a memory controller, a peripheral bus, a network bus and a local bus using any of a variety of bus architectures. The memory 40 can include read only memory (ROM) and random access memory (RAM). A basic input/output (BIOS) containing the basic routine that helps to transfer information between elements within the computer 20, such as during start-up, is stored in ROM. Memory 40 can also include storage devices, such as a hard disk, a floppy disk drive, an optical disk drive, etc., that are coupled to the system bus 42 and are used for storage of program modules and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 40 from at least one of the storage devices 44 with or without accompanying data.

An input device 46, such as a keyboard 48, pointing device (mouse 50), a touch-screen, or the like, allows an operator to provide commands or an input instruction to computer 20. A display device 34, such as a monitor, or other type of output device is further connected to the system bus 42 via a suitable interface and provides feedback to the operator. Computer 20 can communicate to other computers, or a network of computers, such as the Internet through a communications link, and an interface, such as a modem. In one embodiment, GUI 32 can instruct computer 20 to organize, present and solicit information to and from the FMS 18 through a "Website" commonly used on the Internet. In such a situation, the computer 20 is identified as a server, while remote computers are identified as clients. Remote customers can access the Website using a conventional desktop computer or other Internet device and a browser such as MICROSOFT INTERNET EXPLORER or NETSCAPE NAVIGATOR®.

One embodiment of graphical interface 32 includes at least one device icon 52 and at least one test procedure icon 54, as shown in FIG. 2. In one embodiment, device icon 52 identifies testing data 22 of a field device 4 and test procedure icon 54 identifies a test procedure 24. Alternatively, device icon 52 can identify a device description record (not shown) that is managed by FMS 18 and contains device-specific information relating to the field device 4 including testing data 22. When a device icon 52 is associated with a test procedure icon 54, a test definition 26 for the field device 4 relating to the device icon 52 is created.

The icons 52 and 54 can be graphical elements consisting of text, a drawing or an image, or a combination of text and drawings or images. One embodiment of device icon 52 includes a graphical element that describes or is indicative of the device 4 or the type of device 4 that relates to the device icon 52. In another embodiment, device icon 52 includes a graphical element that describes or is indicative of the location of the device 4, within processing plant 2, that relates to the device icon 52. Thus, device icons 52 can relate to a particular device 4 and a particular location within processing plant 2. Additional embodiments of device icon 52 include combinations of the above. For example, device icon 52 can include a graphical element consisting of an image that is indicative of a type of device 4, and text that describes a specific location of the device 4 that relates to device icon 52.

As discussed above, FMS 18 manages device-specific information for field devices 4 including testing data 22. In one embodiment, testing data 22 includes testing data fields 56 which identify testing data elements 58, as shown in FIG. 2. For example, testing data field 56 labeled "COMPENSATION" identifies testing data element 58 having a value "K" that indicates the type of thermocouple used so that the proper cold junction compensation can be provided. Also, the testing data field 56 labeled "RESPONSE TIME" identifies the testing data element 58 having a value "1.5" that indicates the response time of the field device for a particular measurement.

Test procedures 24, also referred to as "test schemes", each define a test that can be performed on devices 4. In one embodiment, test procedure 24 includes a list of device testing parameters 60, shown in FIG. 3. Device testing parameters 60 can correspond to a portion of testing data 22 of device 4 that is to be used in the formation of a test definition 26. In the example shown in FIG. 3, the device testing parameter 60 labeled "COMPENSATION" corresponds to testing data field 56 of the same label. Thus, when test definition 26 is formed, the value "K" of testing data element 58 is included in the test definition 26 that is created by FMS 18. Device testing parameters 60 can also identify test procedure data elements 62 containing values used to define the test that is to be included in test definition 26. For example, the device testing parameter 60 labeled "TEST POINTS" identifies the test procedure data element 62 having the value "4" that indicates the number of test points used to cover a. measuring range of a device 4. Another example, is the device testing parameter 60 labeled "FREQUENCY" that identifies test procedure data element 62 having the value "2" that indicates how often or when the device 4 is to be tested.

A test definition 26 for a particular device 4 can be formed within FMS 18 by combining test procedure 24 with at least a portion of testing data 22 relating to the particular device 4, as illustrated in FIG. 3. Thus, when a device icon 52 that identifies testing data 22 of a field device 4 is associated with a test procedure icon 54 that identifies a test procedure 24, a test definition 26 for the field device 4 is created in accordance with the test procedure 24 using the testing data 22.

An operator can associate a device icon 52 with a test procedure icon 54 using an input device 46. In one embodiment, device icon 52 can be associated with a test procedure icon 54 using a dragging and dropping procedure similar to that used by various operating systems, such as Windows® 98 by Microsoft, to move files from one folder to another. The dragging and dropping procedure can be implemented with mouse 50 or any other suitable input device. Thus, device icon 52 can be associated with test procedure icon 54 by dragging device icon 52 to the test procedure icon 54 and dropping the device icon 52 into test procedure icon 54. In another embodiment, test procedure icon 52 can be associated with device icon 54 by dragging test procedure icon 52 to the device icon 54 and dropping the test procedure icon 52 into device icon 54.

Figure 5:
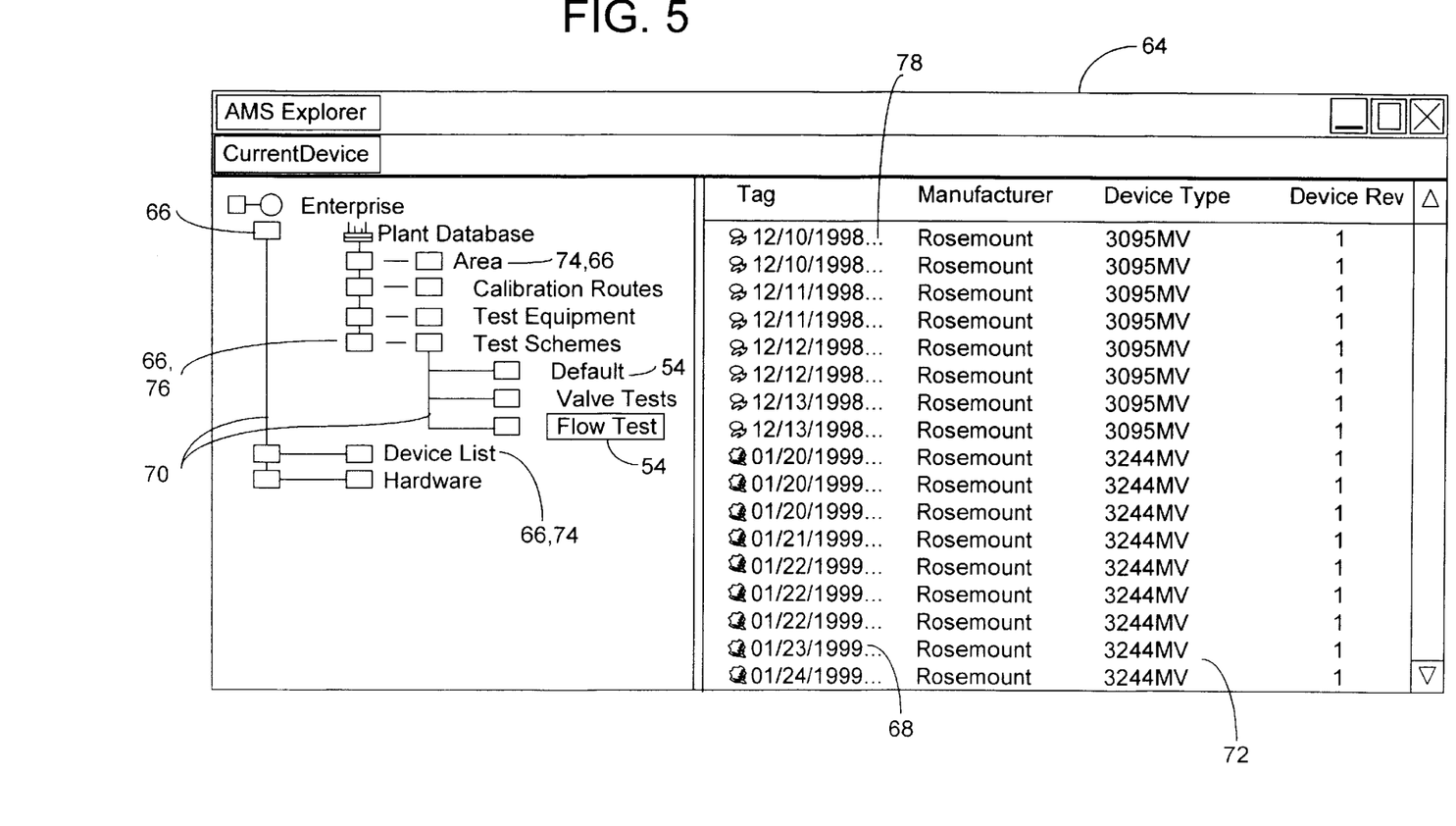
FIGS. 5–9 are screenshots of an interface in accordance with an embodiment.

FIG. 5 shows a sample screenshot of an embodiment of GUI 32 depicted as an Explorer window 64 that allows a user to organize information managed by FMS 18. GUI 32 can include multiple windows 64, such as that shown in FIG. 5. In this embodiment, GUI 32 presents information managed by FMS 18 in a hierarchical fashion having high level expandable icons 66 and bottom level non-expandable icons 68. For example, information relating to a plant database is identified by the expandable icon labeled "Plant Database". Additional expandable icons 66 labeled "Area", "Calibration Routes", "Test Equipment", and "Test Schemes", are located at a level that is expandable from the "Plant Database" icon. Each level of expansion can be identified by a branch 70. Additional levels of expansion may be available under each of the icons 66 as is needed.

At the level that is expandable from the "Test Schemes" icon, are a list of icons 66 labeled "Default", "Valve Tests", and "Flow Tests", as shown in FIG. 5. Although these icons contain a level of expansion, the expandable level is not indicated by a branch 70. Instead, a list of non-expandable icons 68 is presented in a sub-window 72 when one of these icons, for example, the "Flow Tests" icon, is selected by the user. These non-expandable icons 68 generally represent or identify individual data files, such as devices 4 or related device-specific information, test procedures 24, and test definitions 26.

Figure 6:
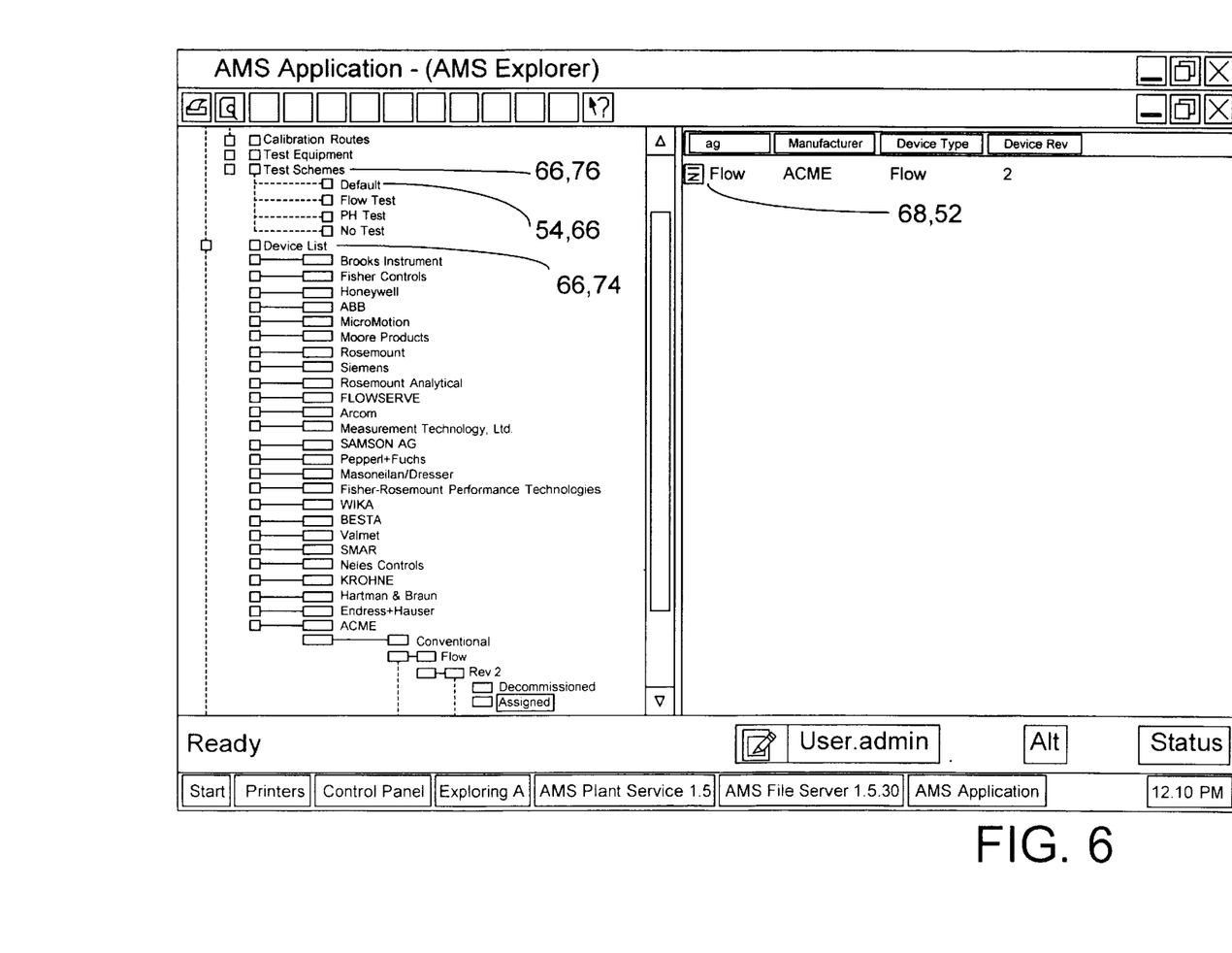

One embodiment of GUI 32 includes a device list icon 74, device icon 52, a test procedure list icon 76, and test procedure icon 54. In one embodiment, device list icon 74, labeled "Device List", is an expandable icon 66 and is depicted in the sample screenshots of FIGS. 5 and 6. The sample screenshot of FIG. 6 shows an example of some of the levels that are expandable under device list icon 74. Device icon 52 labeled "Flow1", shown in FIG. 6, is at a level expandable from device list icon 74. Device icon 52 is a non-expandable icon 68 and generally identifies testing data 22 as discussed above.

FIG. 5 shows another embodiment of device list icon 74, labeled "Area", under which device icons 52 are organized according to the location of their associated field devices 4 in processing plant 2. This embodiment allows a technician to create test definitions 26 by associating device icons 52 relating to various plant locations with test procedures 24. As a result, the technician can store a group of test definitions 26, according to a planned route through processing plant 2, which can be downloaded into calibrator 28. Since several devices 4 may be located within the same area of processing plant 2, similarly located device icons 52 can include distinguishing features, such as, different colors or text for identification purposes.

Test procedure list icon 76, shown in FIGS. 5 and 6, is labeled "Test Schemes" and is an expandable icon 66. The general purpose of test procedure list icon 76 is to organize test procedure icons 54 located at a level that is expandable from the test procedure list icon 76. As discussed above, test procedure icons 54 generally identify various test procedures. For example, the test procedure icon 54 labeled "Default" can represent a default test that is a standard non-customized test provided by FMS 18, whereas the test procedure icon 54 labeled "Flow Tests" can identify a custom test procedure that defines a test for flow devices. Test procedure icons 54 can either be expandable icons 66 or non-expandable icons 68 that can contain a list of tags 78 generally in a sub-window 72. One embodiment of tags 78 can identify devices 4 that are affiliated with the test procedure 24 identified by the test procedure icon 54. Another embodiment of tags 78 can identify test definitions 26 created by associating a device icon 52 with the test procedure icon 54.

Another embodiment of GUI 32 allows the user to access context menus of the various icons.

Figure 7:
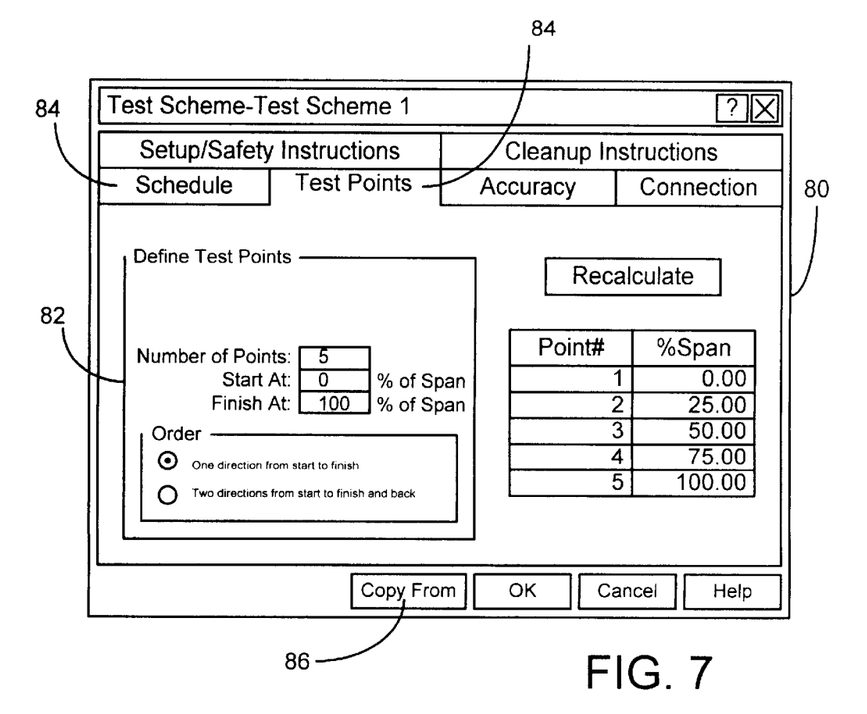
Figure 8:
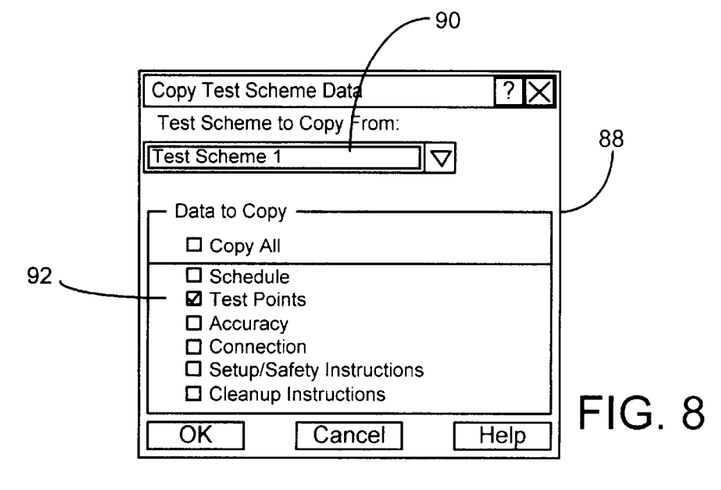

Context menus can be accessed using an input device 46, such as by "right-clicking" an icon with mouse 50 or by several other methods commonly used in windows environments. The context menus can provide the user with a list of options and possibly additional information. Context menus can be associated with test procedure list icons 76, test procedure icons 54, and device icons 52. One embodiment of the context menu associated with the test procedure list icon 76 can include an option that allows the user to add a new test procedure identified by a new test procedure icon 54. When this option is selected, the user may be prompted to enter a name for the new test procedure or test procedure icon 54. The new test procedure can initially be identical to a default test procedure. Additional options can include selections such as Help, Rename, Move, Copy, Delete, Print, and other useful options One embodiment of the context menus associated the test procedure icon 54 can provide options that allow the user to create new test definitions 26 by associating process devices 4 or process device icons 52 with the test procedure icon 54. For example, a user could use the context menu of the test procedure icon 54 labeled "Valve Tests" to associate the test procedure 24 identified by the icon with device icon 52 labeled "Flow1", shown in FIG. 6, to create a test definition 26. Another option could allow the user to view and edit the test procedure 24 associated with a test procedure icon 54, such as the test procedure 24 for the icon labeled "Default". In one embodiment, a test procedure dialog window 80 opens when this option is selected, such as that shown in FIG. 7. Test procedure dialog window 80 can include tabs 84 that open sub-windows 82 containing information relating to the test procedure 24, such as setup and safety instructions, cleanup instructions, scheduling, test point settings, accuracy settings, and connection settings. For example, FIG. 7 shows that tab 84 labeled "Test Points" has been selected revealing sub-window 82 containing information relating to the test points of the associated test procedure 24. In this sub-window 82, the user can make adjustments to the test points, such as the number of test points, the order of the test points, and the span percentage of the test points. Another option that can be available under the context menu of test procedure. icon 54 allows the user to copy data to the associated test procedure 24 from another test procedure 24. In one embodiment, this option is selected using button 86, that can open a window 88, shown in FIG. 8. Window 88 can provide the user with a pull-down menu 90 for selecting a test procedure 24 to be copied, and a series of selection boxes 92 for selecting what data of the test procedure 24 is to be copied. Additional options available under the context menu for test procedure icon 54 can include: renaming the test procedure icon 54 or the associated test procedure 24; deleting the test procedure 24; and others such as a Help and Print.

One embodiment of the context menu associated with the device list icon 74 can include an option that allows the user to add a new device icon 52 that identifies a device 4. When this option is selected, the user may be prompted to enter a name for the new device icon 52. Additional options can include selections such as Help, Rename, Move, Copy, Delete, Print, and other useful options.

Figure 9:
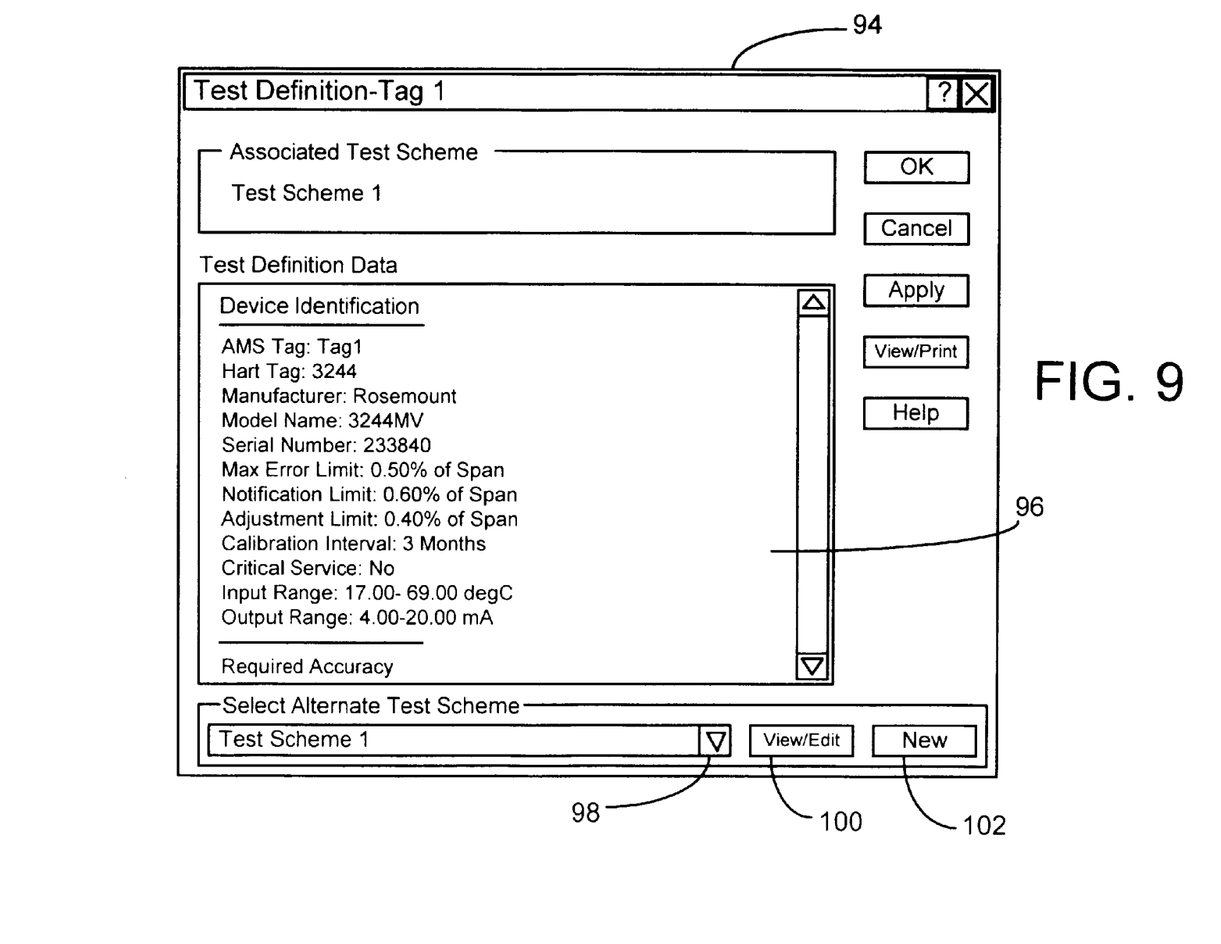

One embodiment of the context menus associated with a device icon 52 can allow a user to associate the device icon 52 to a test procedure icon 54 to create a test definition 26 for the device 4 associated with the device icon 52. Thus, for example, the device icon 52 labeled "Flow1" can be associated with the test procedure icon 54 labeled "Flow Tests" using the context menu of the "Flow1" icon. Another option can include viewing and editing the test definition 26 that is associated with the device icon 52. In one embodiment, when this option is selected a test definition dialog window 94 opens, such as that shown in FIG. 9. The user can be provided the details of the test definition 26 in a read only format in window 96. The user can have an option to select an alternate test procedure 24 (labeled test scheme) using a pull-down menu 98. Additional options that can be available in window 94 include allowing the user to view and edit the test procedure 24 associated with the. test definition 26 or to create a new test procedure 24 as indicated by buttons 100 and 102, respectively. Further options available under the context menu for device icon 52 can include: renaming the device icon 52 or the associated device 4; deleting the device icon 52; viewing and editing the associated testing data 22 or the associated test definition 26; copying the associated testing data 22; and others.

What is claimed is:

1. A method for graphically managing test definitions, which are used by calibrators to test field devices, the method comprising:

associating a device icon on a display with a test procedure icon on the display, wherein the device icon identifies testing data of a field device, and wherein the test procedure icon identifies a test procedure having device testing parameters that correspond to the testing data;

creating a test definition for the field device using the testing data in accordance with the test procedure.

2. The method of claim 1, wherein associating includes dragging the device icon across the display to the test procedure icon and dropping the device icon into the test procedure icon.

3. The method of claim 1, wherein associating includes dragging the test procedure icon across the display to the device icon and dropping the test procedure icon into the device icon.

4. The method of claim 1, wherein the device icon includes at least one graphical element selected from the list consisting of an image, a drawing, and text.

5. The method of claim 4, wherein the at least one graphical element describes the field device.

6. The method of claim 4, wherein the at least one graphical element describes a location of the field device.

7. A method for graphically managing test definitions, which are used by calibrators to test field devices, the method comprising:

displaying at least one device icon on a display, wherein the device icon identifies testing data of a field device;

displaying at least one test procedure icon on the display, the test procedure icon identifies a test procedure, wherein the test procedure includes device testing parameters that correspond to the testing data;

associating the device icon to the test procedure icon; and creating a test definition for the field device using the testing data in accordance with the test procedure.

8. The method of claim 7, wherein associating includes dragging the device icon across the display to the test procedure icon and dropping the device icon into the test procedure icon.

9. The method of claim 7, wherein associating includes dragging the test procedure icon across the display to the device icon and dropping the test procedure into the device icon.

10. An apparatus for graphically managing test definitions, which are used by calibrators to test field devices, the apparatus comprising:

a display;

a processor operably coupleable to the display;

a memory coupled to the processor;

a program residing in the memory, the program including instructions to provide a graphical user interface on the display comprising:

i) at least one device icon, wherein the device icon identifies testing data of a field device; and ii) at least one test procedure icon, wherein the test procedure icon identifies a test procedure having device testing parameters corresponding to the testing data; wherein a test definition is created for the field device when the device icon is associated with the test procedure icon.

11. The apparatus of claim 10 further comprising a context menu associated with the device icon, wherein the context menu associated with the device icon provides at least one option selected from the list consisting of associating the device icon with a test procedure icon, viewing a test definition that is associated with the device icon, editing the test definition that is associated with the device icon, renaming the device icon, deleting the device icon, viewing the testing data identified by the device icon, and editing the testing data identified by the device icon.

12. The apparatus of claim 10 further comprising a context menu associated with the test procedure icon, wherein the context menu associated with the test procedure icon provides at least one option selected from the list consisting of associating the test procedure icon with a device icon, viewing the test procedure identified by the test procedure icon, editing the test procedure identified by the test procedure icon, copying information from another test procedure to the test procedure identified by the test procedure icon, and renaming the test procedure icon.

13. A test definition management interface for use by a field management system (FMS) used to manage field devices, and executed by programmed instructions on a general purpose computer; the general purpose computer including a memory in which the programmed instructions are stored, an input device to supply input information for interaction with the programmed instructions, and a display device for displaying information created by the programmed instructions and the input information; the test definition management interface comprising:

a device list icon at an expandable level from which at least one additional level can expand from;

at least one device icon at a level expandable from the device list icon, wherein the device icon identifies testing data of a field device;

a test procedure list icon at an expandable level from which at least one additional level can expand from;

at least one test procedure icon at a level expandable from the test procedure list icon, wherein;

the test procedure icon identifies a test procedure having device testing parameters corresponding to the testing data; and a test definition for the field device is created when the device icon is associated with the test procedure icon.

14. The method of claim 13, further comprising a list of affiliated device icons at a level expandable from the test procedure icon.

15. The method of claim 13, wherein the device icon is organized under the device list icon according to a type of the field device.

16. The method of claim 13, wherein the device icon is organized under the device list icon according to a location of the field device.

17. The apparatus of claim 13 further comprising a context menu associated with the test procedure list icon, wherein the context menu associated with the test procedure list icon provides an option selected from the list consisting of adding a new test procedure icon to a level that is expandable from the test procedure list icon, and renaming the test procedure list icon.

18. The apparatus of claim 13 further comprising a context menu associated with the test procedure icon, wherein the context menu associated with the test procedure icon provides at least one option selected from the list consisting of associating the test procedure icon with a device icon, viewing the test procedure identified by the test procedure icon, editing the test procedure identified by the test procedure icon, copying information from another test procedure to the test procedure identified by the test procedure icon, and renaming the test procedure icon.

19. The apparatus of claim 13 further comprising a context menu associated with the device list icon, wherein the context menu associated with the device list icon provides an option selected from the list consisting of adding a new device icon to a level that is expandable from the device list icon, and renaming the device list icon.

20. The apparatus of claim 13 further comprising a context menu associated with the device icon, wherein the context menu associated with the device icon provides at least one option selected from the list consisting of associating the device icon with a test procedure icon, viewing a test definition that is associated with the device icon, editing the test definition that is associated with the device icon, renaming the device icon, deleting the device icon, viewing the testing data identified by the device icon, and editing the testing data identified by the device icon.

21. A computer readable medium having stored instructions executable by a processor, the instructions comprising:

instructions for receiving an input associating a device icon with a test procedure icon, wherein the device icon identifies testing data of a field device, and wherein the test procedure icon identifies a test procedure having device testing parameters that correspond to the testing data; and instructions for creating a test definition in accordance with the test procedure using the testing data, wherein the test definition can be used by a calibrator to test the field device.

22. The invention of claim 21, wherein the input associating the device icon with the test procedure icon includes dragging the device icon across a display to the test procedure icon and dropping the device icon into the test procedure icon.

23. The invention of claim 21, wherein the input associating the device icon with the test procedure icon includes dragging the test procedure icon across a display to the device icon and dropping the test procedure icon into the device icon.

24. A computer readable medium having stored instructions executable by a processor, the instructions comprising:

instructions for displaying at least one device icon on a display, wherein the device icon identifies testing data of a field device;

instructions for displaying at least one test procedure icon on the display, wherein the test procedure icon identifies a test procedure having device testing parameters that correspond to the testing data;

instructions for receiving an input associating the device icon with the test procedure icon; and instructions for creating a test definition for the field device when the device icon is associated with the test procedure icon, wherein the test definition can be used by a calibrator to test the field device.

25. The invention of claim 24, wherein the input associating the device icon with the test procedure icon includes dragging the device icon across the display to the test procedure icon and dropping the device icon into the test procedure icon.

26. The invention of claim 24, wherein the input associating the device icon with the test procedure icon includes dragging the test procedure icon to the device icon across the display and dropping the test procedure icon into the device icon.

27. An apparatus for managing test definitions, which are used by calibrators to test field devices, the apparatus comprising:

means for displaying a device icon on a display, wherein the device icon identifies testing data of a field device;

means for displaying a test procedure icon on the display, wherein the test procedure icon identifies a test procedure having device testing parameters that correspond to the testing data;

means for associating the device icon with the test procedure icon; and means for creating a test definition for the field device using the testing data in accordance with the test procedure.

28. The apparatus of claim 27, wherein the means for associating includes dragging the device icon across the display to the test procedure icon and dropping the device icon into the test procedure icon.

29. The apparatus of claim 27, wherein the means for associating includes dragging the test procedure icon across the display to the device icon and dropping the test procedure icon into the device icon.

* * * * *